G. V. KRICHBAUM.
INNER TIRE.
APPLICATION FILED DEC. 4, 1913.
1,137,064.
Patented Apr. 27, 1915.
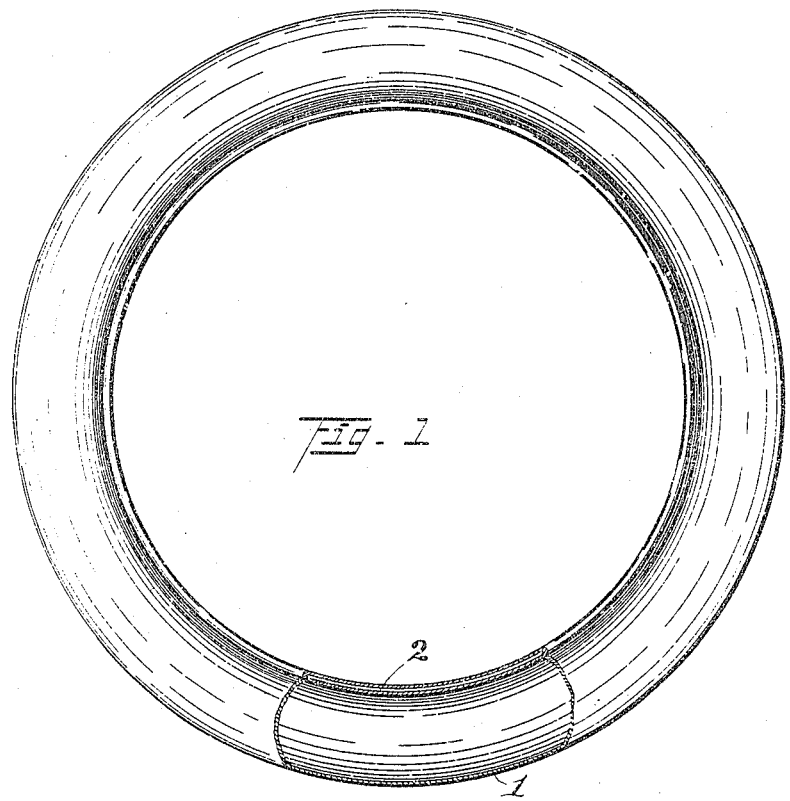
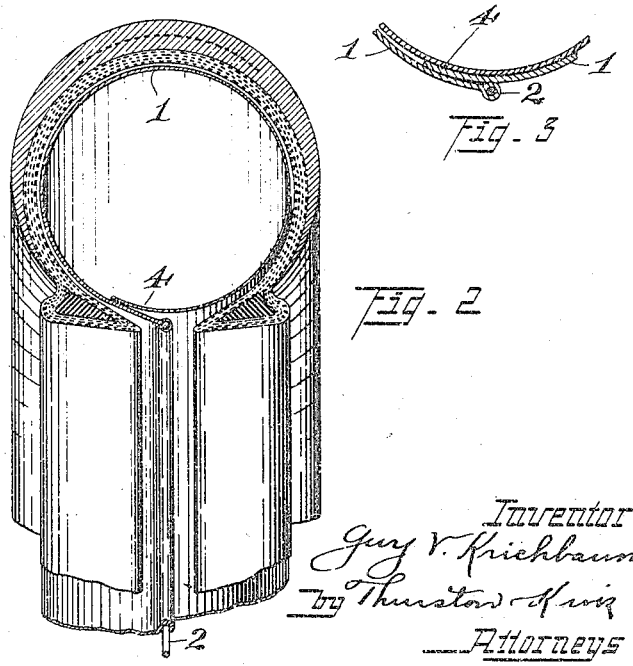

UNITED STATES PATENT OFFICE.

GUY V. KRICHBAUM, OF ASHLAND, OHIO.

INNER TIRE.

1,137,064.

Specification of Letters Patent. Patented Apr. 27, 1915.

Application filed December 4, 1913. Serial No. 804,570.

*To all whom it may concern:*

Be it known that I, GUY V. KRICHBAUM, a citizen of the United States, residing at Ashland, in the county of Ashland and State of Ohio, have invented a certain new and useful Improvement in Inner Tires, of which the following is a full, clear, and exact description.

This invention relates to a device adapted to be inserted within the outer tire or shoe of a tire, such as is ordinarily used upon automobiles, the same forming a reinforcement for the outer tire, giving the tire a longer useful life, preventing blowouts, and forming a supporting and holding medium in the event that the outer tire is cut.

Generally speaking, the invention comprises the elements and combinations thereof set forth in the accompanying claims.

Reference should be had to the accompanying drawings forming a part of this specification, in which—

Figure 1 is a side elevation of the device of my invention, with certain portions shown in section; and Fig. 2 shows, in section, a portion of a tire with the device of my invention incorporated therein.

The device, or inner tire, as will be clearly seen from the drawing, comprises a body which is indicated at 1, the same being constructed of one or more plies of fabric or other flexible material which may be arranged with respect to each other in any desired manner. These plies of fabric will have previously been impregnated with suitable rubber solution, and the device itself is formed upon a suitable form or mandrel to give the same in general the shape of an automobile tire.

The device when thus formed is treated in a suitable vulcanizing furnace, and I prefer to treat the same until the rubber solution with which the fabric is impregnated is semicured,—that is to say, the rubber is not fully cured. The semi-curing is desirable and advisable in that it insures great flexibility and consequently longer life when the device is in use within a tire.

The outer surface of the device may be coated with a suitably prepared rubber gum solution with vulcanizing properties, so that when the device has been inserted in a tire, and the tire is put in use, the heat engendered by the passing of the tire over the road, will serve to cause the device to become attached to the tire, by virtue of the vulcanizing solution having become vulcanized or substantially vulcanized to the tire, thereby uniting the tire and the inner tire of my invention to form substantially one body. These matters are more particularly explained and claimed in Patent No. 945,649, granted to James C. Warring and in Patent No. 944,722, granted to Brent S. Eshelman.

The device herein described is made in the form of an endless tube, the inner edges of which are not united, but are free,—the edges being sufficiently long so that there is an overlapping. One of the edges has secured thereto a non-extensible and fairly rigid material, which in the present portion is shown as a wire, as indicated at 2 in Fig. 2. In the device as shown, the wire extends continuously throughout the peripheral length of the edge to which it is secured, and the wire is held by enfolding the same within a piece of fabric or other flexible material which forms a portion of one of the inner edges,—the fabric being suitably held to inclose the wire, by the use of cement or by vulcanization. The other edge of the inner tire is free and it is intended that the free end shall lap upon and pass the edge which carries the wire, preferably upon the inside. This construction results in an inner tire which has adjustability. That is to say, the device may be adjusted within any given tire, so that it will absolutely conform to the walls of that tire.

It frequently happens that in tires of different makes, that tires rated to be of the same size vary slightly from what should be their true dimensions. That is to say, all tires which are rated, for instance, 34″ by 4″ are not always exactly of this size, and frequently the diameter will vary as much as one-half inch. It will be apparent that with a device such as herein illustrated, the inner tire may be adjusted so as to accurately fill the tire and coöperate with the inner walls at all points, which would not be the case were the inner tire made to be exactly of a given diameter, where the tire may vary from its correct or rated diameter.

After an inner tire has been inserted in a tire and the inner tube has been inflated, it will press the overlapping pal 4, into close engagement with the edge of the inner tire that carries the wire 2. This will cause the flap 4 to lock around the wire 2, and thus hold the flap 4 from displacement. In addition, it will be appreciated that the flap 4 serves as a protection to the inner tube against any pinching which is frequently a cause for rapid wear in an inner tube. Also the flap 4 being semi-cured, it is soft and pliable and will hug the wire edge more firmly than if fully cured, and will make a better cushion for the tube to rest against.

The diameter of the wire 2 will be such that it will comfortably fit upon the rim of a wheel to which it is applied, and lie between the beads which are usually formed upon the edges of the outer tire or shoe. Therefore the edge of the inner tire to which the wire 2 is attached, will be securely anchored, so that the edge may not crawl or creep up the side walls of the outer tire.

As before stated, the edge or overlapping portion 4 is held by the lock which is formed when the inner tube is inflated and presses the flap 4 into engagement with the edge which carries the wire 2.

Having thus described my invention, what I claim is:

1. An inner tire for use in automobile tires comprising a hollow tubular body made of flexible material, the body being split upon its inner surface to form edges, non-stretchable material associated with one of said edges, the other edge being unsecured and adapted to overlap and lock around the first mentioned edge, whereby the edges are held against creeping when the inner tube is inflated.

2. An inner tire for use in automobile tires comprising a hollow tubular body, the body being split upon its inner surface to form edges, a non-stretchable substantially rigid means associated with one of said edges, the other of said edges being unscrewed and overlapping the aforesaid means, and being adapted to lock around the said non-stretchable means when the inner tube of the tire is inflated.

3. An inner tire for use in automobile tires comprising a hollow tubular body, made of flexible material the body being split upon its inner surface to form edges, an annular wire member associated with one of said edges and adapted to encircle the rim of the wheel to which it may be applied, the other edge of the tubular body being unsecured and being adapted to extend upwardly upon the inner walls of the inner tire and to lock around the said wire when the inner tube of the tire is inflated.

In testimony whereof, I hereunto affix my signature in the presence of two witnesses.

GUY V. KRICHBAUM.

Witnesses:
EARL HAMILTON,
THOS. H. MOORE.